United States Patent
Fiaschi et al.

(10) Patent No.: US 10,122,755 B2
(45) Date of Patent: Nov. 6, 2018

(54) METHOD AND APPARATUS FOR DETECTING THAT AN ATTACKER HAS SENT ONE OR MORE MESSAGES TO A RECEIVER NODE

(71) Applicant: TELEFONAKTIEBOLAGET LM ERICSSON (PUBL), Stockholm (SE)

(72) Inventors: Giovanni Fiaschi, Genoa (IT); Géza Gaál, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 92 days.

(21) Appl. No.: 15/103,390

(22) PCT Filed: Jan. 23, 2014

(86) PCT No.: PCT/EP2014/051328
§ 371 (c)(1),
(2) Date: Jun. 10, 2016

(87) PCT Pub. No.: WO2015/096905
PCT Pub. Date: Jul. 2, 2015

(65) Prior Publication Data
US 2016/0315963 A1    Oct. 27, 2016

Related U.S. Application Data

(63) Continuation of application No. PCT/EP2013/077999, filed on Dec. 24, 2013.

(51) Int. Cl.
H04L 29/06   (2006.01)
(52) U.S. Cl.
CPC ........ H04L 63/1466 (2013.01); H04L 63/123 (2013.01); H04L 63/126 (2013.01); H04L 63/1458 (2013.01)

(58) Field of Classification Search
CPC . H04L 63/1466; H04L 63/126; H04L 63/123; H04L 63/1458; H04L 63/08
(Continued)

(56) References Cited

U.S. PATENT DOCUMENTS 7,500,264 B1    3/2009 Leavy et al.
2004/0103282 A1*  5/2004 Meier ............... G06Q 20/3674
                                                              713/171
(Continued)

FOREIGN PATENT DOCUMENTS

WO    2004055634 A2    7/2004

OTHER PUBLICATIONS

Mitchell, Changhua He John C., and Changhua He. "Security Analysis and Improvements for IEEE 802.11 i." The 12th Annual Network and Distributed System Security Symposium (NDSS'05) Stanford University, Stanford. 2005.*
(Continued)

Primary Examiner — Syed A Zaidi
(74) Attorney, Agent, or Firm — Patent Portfolio Builders PLLC

(57) ABSTRACT

The present invention provides a method and apparatus for detecting that an attacker has sent one or more messages to a receiver node. The method comprises storing at least a portion of an nth message received by the receiver node from a sender node in a memory device; sending an integrity check message to the sender node comprising an indication of the value of n; receiving a reply message from the sender node including at least a portion of the nth message sent by the sender node to the receiver node; and comparing the at least a portion of the nth message sent by the sender node to the receiver node with the nth message received by the receiver node from the sender node stored in the memory device.

20 Claims, 5 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2004/0142710 | A1* | 7/2004 | Liang .................... | H04L 63/123 455/466 |
| 2005/0086465 | A1* | 4/2005 | Sapkota ................. | H04L 63/08 713/150 |
| 2005/0097315 | A1* | 5/2005 | Carmeli ............. | H04L 63/0428 713/160 |
| 2005/0207581 | A1* | 9/2005 | Qi ........................ | H04W 12/02 380/270 |
| 2005/0278548 | A1* | 12/2005 | Lin ........................ | H04L 9/002 713/189 |
| 2007/0076885 | A1* | 4/2007 | Sood .................... | H04L 63/123 380/270 |
| 2007/0081673 | A1* | 4/2007 | Ren ...................... | H04L 9/0637 380/270 |
| 2007/0115858 | A1* | 5/2007 | Moritomo ............ | H04L 63/123 370/254 |
| 2007/0165865 | A1* | 7/2007 | Talvitie ............... | H04L 63/0428 380/286 |
| 2011/0055558 | A1* | 3/2011 | Liu ....................... | H04L 9/0637 713/160 |

OTHER PUBLICATIONS

Junaid, Muhammad, M. Akbar, and Muid Mufti. "Per Packet Authentication for IEEE 802.11 wireless LAN." Multitopic Conference, 2008. INMIC 2008. IEEE International. IEEE, 2008.*

Cheikhrouhou, Omar, et al. "An EAP-EHash authentication method adapted to resource constrained terminals." annals of telecommunications-annales des télécommunications 65.5-6 (2010): 271-284.*

International Search Report dated Sep. 5, 2014 in related International Application No. PCT/EP2014/051328.

IEEE Computer Society, "IEEE Standard for Local and metropolitan area networks: Media Access Control (MAC) Security," IEEE Std 802.1AE™—2006, Aug. 18, 2006.

IEEE Computer Society, "IEEE Standard for Local and metropolitan area networks: Port-Based Network Access Control," IEEE Std 802.1X™—2004, Dec. 13, 2004.

IEEE Computer Society, "IEEE Standard for Local and metropolitan area networks—Port-Based Network Access Control," IEEE Std 802.1X™—2010, Feb. 5, 2010.

Eastlake, "Cryptographic Algorithm Implementation Requirements for Encapsulating Security Payload (ESP) and Authentication Header (AH)," Network Working Group, Request for Comments: 4305, Dec. 2005.

Kaufman, "Internet Key Exchange (IKEv2) Protocol," Network Working Group, Request for Comments: 4306, Dec. 2005.

Kaufman et al., "Internet Key Exchange Protocol Version 2 (IKEv2)," Internet Engineering Task Force (IETF), Request for Comments: 5996, Sep. 2010.

Kent et al., "Security Architecture for the Internet Protocol," Network Working Group, Request for Comments: 4301, Dec. 2005.

Kent, "IP Authentication Header," Network Working Group, Request for Comments: 4302, Dec. 2005.

Kent, "IP Encapsulating Security Payload (ESP)," Network Working Group, Request for Comments: 4303, Dec. 2005.

Manral, "Cryptographic Algorithm Implementation Requirements for Encapsulating Security Payload (ESP) and Authentication Header (AH)," Network Working Group, Request for Comments: 4835, Apr. 2007.

Schiller, "Cryptographic Algorithms for Use in the Internet Key Exchange Version 2 (IKEv2)," Network Working Group, Request for Comments: 4307, Dec. 2005.

* cited by examiner

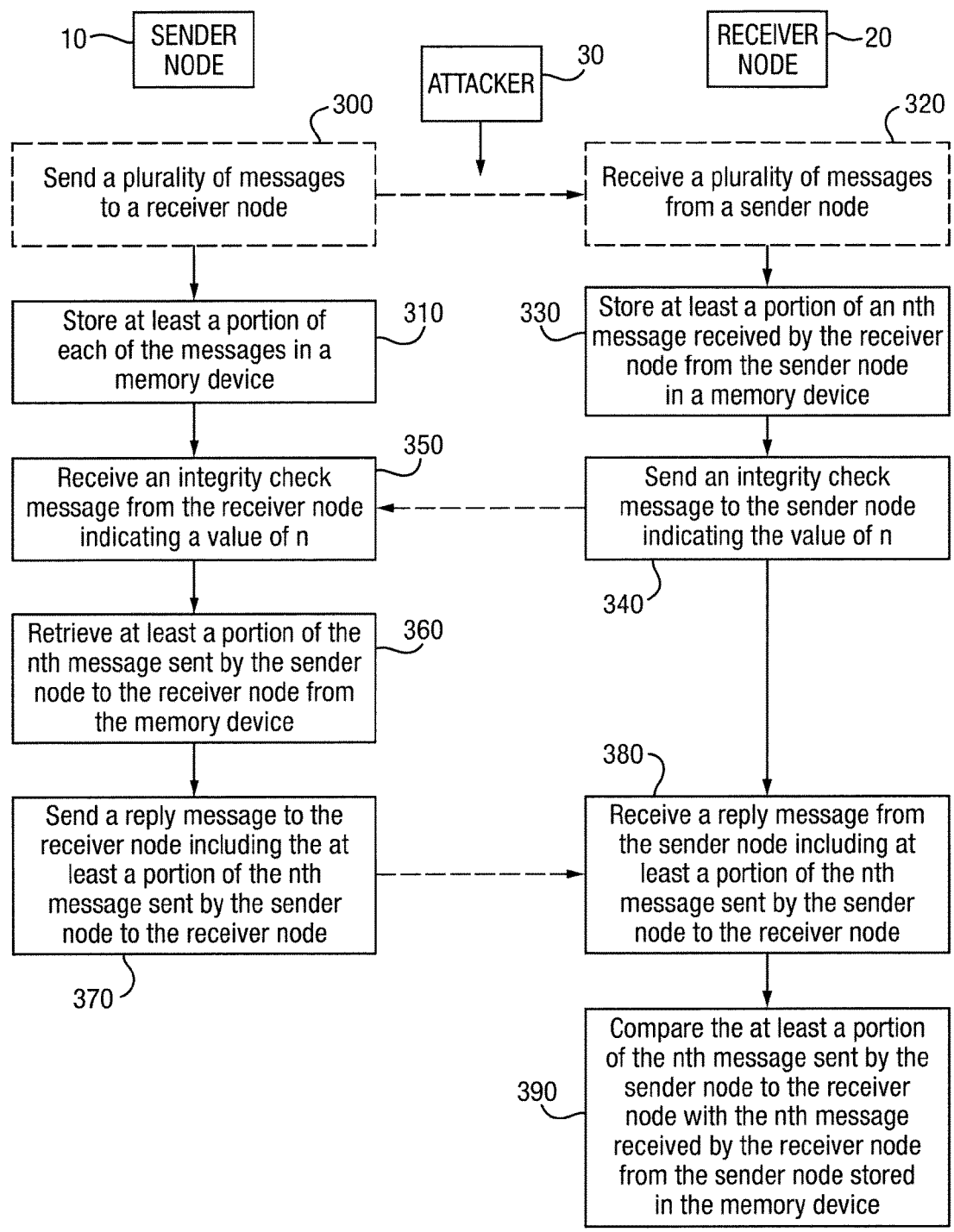

METHOD AND APPARATUS FOR DETECTING THAT AN ATTACKER HAS SENT ONE OR MORE MESSAGES TO A RECEIVER NODE

TECHNICAL FIELD

The present invention relates to a method and apparatus for detecting that an attacker has sent one or more messages to a receiver node.

BACKGROUND

Network security protocols such as IPsec and MACsec typically provide three security services: authentication, integrity and confidentiality.

Authentication enables a sender node and a receiver node to each verify the identity of the other before a communication session is set up between the sender node and the receiver node. Authentication may be implemented using a specific protocol, for example IKE in IPsec and IEEE 802.1X in MACsec. The sender node and receiver node may for example exchange credentials, certificates or show that they own a pre-shared secret. At this stage, the sender node and the receiver node may also agree on keys for providing integrity and confidentiality during the communication session.

During the communication session, the sender node generates an ICV (Integrity Check Value) for each message to be sent to the receiver node by hashing the contents of the message using the agreed key. The ICV is then added to the message. The agreed key may also be used to encrypt the message. The receiver node can then verify that the sender node did indeed send the message, by using its key to hash the contents of the message and checking that the generated ICV matches the ICV in the message.

This method prevents a MITM (Man In The Middle) Attacker replacing the sender after authentication, for example by spoofing the sender node's MAC address, and tampering with the messages sent by the sender node or, potentially more seriously, injecting unexpected traffic volumes and launching a Denial of Service attack (DoS).

However, the applicant has appreciated that implementing integrity in this way requires substantial processing power at the sender node and the receiver node. Furthermore, if the sender node is designed to transmit messages at high speed, hardware accelerators are often required, in order to generate the ICVs for the messages. These hardware accelerators are costly, and furthermore having to design and implement these accelerators increases the development effort required to provide security.

SUMMARY

According to the present invention there is provided a method for detecting that an attacker has sent one or more messages to a receiver node. The method comprises storing at least a portion of an nth message received by the receiver node from a sender node in a memory device, and sending an integrity check message to the sender node comprising an indication of the value of n. The method further comprises receiving a reply message from the sender node including at least a portion of the nth message sent by the sender node to the receiver node. The method further comprises comparing the at least a portion of the nth message sent by the sender node to the receiver node with the nth message received by the receiver node from the sender node stored in the memory device.

Thus, advantageously, as will be explained in more detail below, embodiments of the present invention enable a DoS to be detected, using less processing power than known methods which require an ICV to be generated for each message sent by the sender node to the receiver node. In addition there is a probability that, if an attacker tampers with a message sent by the sender node to the receiver node (i.e. modifies or replace the message), the attack will be detected. Advantageously, this probability increases in proportion to the number of messages tampered with by the attacker.

In a preferred embodiment of the present invention, the nth message received by the receiver node from the sender node may be selected randomly or pseudo-randomly. Advantageously, this prevents an attacker determining which messages will be integrity checked, and only tampering with those messages which will not be integrity checked.

In a preferred implementation, selecting the nth message received by the receiver node from the sender node may comprise, for each of a plurality of messages received by the receiver node from the sender node generating a number, x, randomly or pseudo-randomly. The number, x, is then compared to a probability, p. The probability, p, indicates the probability that a message received by the receiver node from the sender node is integrity checked.

In a preferred embodiment of the present invention, the integrity check message may further comprise message authentication data for enabling the sender node to verify that the receiver node sent the integrity check message. In addition or alternatively, where the reply message comprises message authentication data, the method may further comprise using the message authentication in the reply message to verify that the sender node sent the reply message.

According to the present invention there is also provided a method, for use at a sender node. The method comprises storing at least a portion of each of a plurality of messages sent by a sender node to a receiver node in a memory device. The method further comprises receiving an integrity check message from the receiver node comprising an indication of a value of n. The method further comprises retrieving at least a portion of the nth message sent by the sender node to the receiver node from the memory device, and sending a reply message to the receiver node including the at least a portion of the nth message sent by the sender node to the receiver node.

In a preferred embodiment of the present invention, where the integrity check message may further comprise message authentication data, the method may further comprise using the message authentication data to verify that the receiver node sent the integrity check message. In addition or alternatively the reply message may further comprise message authentication data for enabling the receiver node to verify that the sender node sent the reply message.

In a preferred implementation, the method may comprise generating the message authentication data in the reply message, by applying a hash function to at least a part of the at least a portion of the nth message sent by the sender node to the receiver node (i.e. to the whole of the nth message or to only a part of the nth message). Advantageously, where the hash function is applied to only a part of the nth message, this may reduce the processing power required to generate the authentication data in comparison to applying the hash function to the whole of the nth message.

There is further provided a computer program configured to, when run on a computer, perform the method according to any preceding claim. The computer program may be in any form, such as a downloadable signal, and may be stored on a computer readable medium.

There is further provided apparatus for detecting that an attacker has sent one or more messages to a receiver node. The apparatus comprises a processor and a memory device. The processor is configured to store at least a portion of an nth message received by the receiver node from a sender node in the memory device. The processor is further configured to send an integrity check message to the sender node comprising an indication of the value of n. The processor is further configured to receive a reply message from the sender node including at least a portion of the nth message sent by the sender node to the receiver node. The processor is further configured to compare the at least a portion of the nth message sent by the sender node to the receiver node with the nth message received by the receiver node from the sender node stored in the memory device.

In a preferred embodiment, the apparatus may further comprise a counter configured to count messages received by the receiver node from the sender node. The processor may be configured to restart the counter after the nth message has been received by the receiver node. Advantageously, this enables, if an attack is detected, it subsequently to be detected whether the attack is on-going (i.e. if one or more messages have been added by an attacker, after the nth message). This also, advantageously, limits the possible values of n.

There is also provided a receiver node comprising the apparatus.

According to the present invention there is further provided, apparatus comprising a processor and a memory device. The processor is configured to store at least a portion of each of a plurality of messages sent by a sender node to a receiver node in a memory device. The processor is further configured to receive an integrity check message from the receiver node comprising an indication of a value of n. The processor is further configured to retrieve at least a portion of the nth message sent by the sender node to the receiver node from the memory device. The processor is further configured to send a reply message to the receiver node including the at least a portion of the nth message sent by the sender node to the receiver node.

In a preferred embodiment of the present invention, the apparatus may further comprise a counter configured to count the messages sent by the sender node to the receiver node. The processor may be configured to re-start the counter to count the messages sent by the sender node to the receiver node from after the nth message sent by the sender node to the receiver node.

According to a preferred embodiment of the present invention, the processor may further be configured to delete or overwrite the at least a portion of each of the plurality of messages which were sent to the receiver node before the nth message. Advantageously, this may allow more efficient use of the memory device.

There is also provided a sender node comprising the apparatus.

BRIEF DESCRIPTION OF THE DRAWINGS

Embodiments of the present invention will now be described, by way of example only, with reference to the accompanying drawings in which:

FIG. 2 is a flow chart showing steps according to embodiments of the present invention;

DESCRIPTION

A method for detecting that an attacker 30 has sent one or more messages to a receiver node 20 according to an embodiment of the present invention will now be described with reference to FIG. 3.

Figure 3:
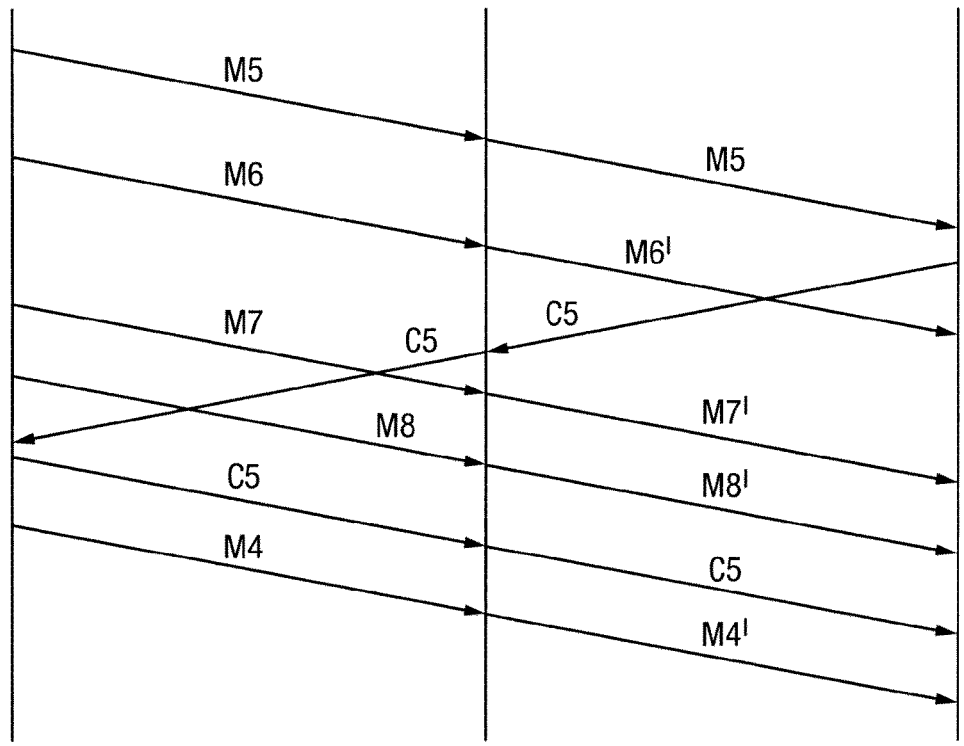
FIG. 3 is a diagram showing an example of an embodiment of the present invention.

In FIG. 3, the steps set out down the right hand side of the page may be performed by the receiver node 20. The steps set out down the left hand side of the page may be performed by a sender node 10, which is configured to send a plurality or stream of messages to the receiver node 20.

The receiver node 20, and similarly the sender node 10, may be any type of communications equipment, for example a user equipment or a gateway node to a communications network. The receiver node 20 and the sender node 10 are connected by one or more links (not shown). These links may comprise any type of transmission medium, such as but not limited to, an optical fibre.

Figure 1:
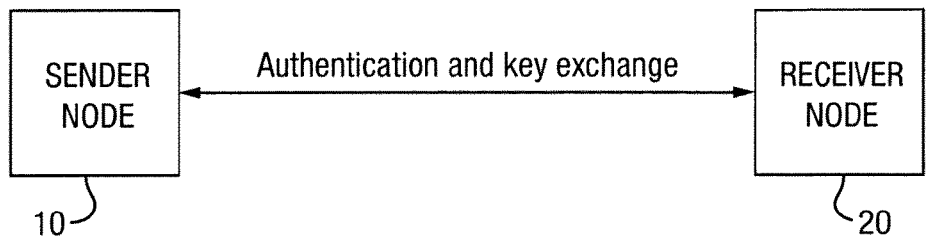
FIG. 1 illustrates a sender node and a receiver node during authentication and key exchange.

Preferably, before a communications session is established between the sender node 10 and the receiver node 20 (and the sender node 10 starts sending messages to the receiver node 20), the sender node 10 and the receiver node 20 are authenticated, as shown in FIG. 1. This may be achieved, as described above, using for example IEEE 802.1X or IKE, depending on the configuration of the network.

At this stage, the sender node 10 and the receiver node 20 may also agree on keys for use in verification, and optionally encryption, during the subsequent communications session. As will be described below these keys will not be used, unlike in the prior art, to add an integrity check value (ICV) to all of the messages sent by the sender node 10 to the receiver node 20—but these keys may be used to add an ICV to the messages involved in the integrity check.

Referring back to FIG. 3, at step 300, the sender node 10 sends a plurality or stream of messages to the receiver node 20. In addition, at step 310, at least a portion of each of those messages is stored in a memory device. Note that none of the messages includes an ICV, or is encrypted. The content of the messages may however be encrypted at a higher network layer.

At step 320, the stream of messages sent by the sender node 10 is received by the receiver node 20 (unless one or more of the messages are intercepted by an attacker 30). In addition, the messages received by the receiver node "from the sender node" may include messages added to the message stream by an attacker 30.

As explained above, an attacker 30 might tamper with one or more of the messages sent by the sender node (i.e. modify the content of the messages or replace the messages with different messages). In addition or alternatively, the attacker 30 may delete one or more messages, or add one or more messages to the message stream. The attacker 30 may add additional messages by for example spoofing the network address of the sender node 10.

From the receiver node's perspective, these messages appear as "messages from the sender node".

After n messages "from the sender node 10" have been received by the receiver node 20 (where n is of course an integer value, and may be greater than one), at step 330, at least a portion of the nth message is stored in a memory device. In addition, at step 340, an integrity check message is sent to the sender node 10 indicating the value of n.

At step 350, the integrity check message from the receiver node 20 is received, and at step 360 at least a portion of the nth message sent by the sender node 10 to the receiver node 20 is retrieved from the memory device. At step 370, a reply message is then sent to the receiver node 20 including the at least the portion of the nth message sent by the sender node 10 to the receiver node 20 retrieved from the memory device.

At step 380, the reply message from the sender node 10 is received, and at step 390, the at least a portion of the nth message sent by the sender node 10 to the receiver node 20 is compared with the nth message received by the receiver node 20 from the sender node 10 stored in the memory device.

If the at least a portion of the nth message sent by the sender node 10 to the receiver node 20 matches the at least a portion of the nth message received by the receiver node 20 from the sender node 10, then it is verified that an attacker 30 has not added any additional messages to the message flow, or tampered with the nth message sent by the sender node 10 to the receiver node 20.

If, however, the at least a portion of the nth message sent by the sender node 10 to the receiver node 20 does not match the at least a portion of the nth message received by the receiver node 20 from the sender node 10, then it may be detected that an attack has occurred. Either an attacker 30 may have added messages to the message flow, such that the nth message sent by the sender node 10 is not the nth message received by the receiver node 20. Or, an attacker 30 may have tampered with (i.e. modified or replaced) the nth message sent by the sender node 10 to the receiver node 20.

Thus, the worst an attacker 30 can do is tamper with (i.e. modify or replace) messages sent by the sender node 10 before the nth message or after the nth message, which are not integrity checked. The attacker 30 cannot add any additional messages or delete any messages.

By way of example, this worst case scenario is shown in FIG. 3. In this example, the sender node 10 sends a plurality of message (not shown) to the receiver node 20. The fifth message sent (M5, n=5) is integrity checked by the receiver node 20. The receiver node 20 sends an integrity check message C5 (which may also be referred to as an integrity check request message or simply as a message) as explained above to the sender node 10. Note that the sender node 10 continues to send messages to the receiver node 20 (M6 to M8) before the integrity check message C5 is received by the sender node 10. Once the integrity check message is received by the sender node 10, the sender node 10 sends a reply message back to the receiver node 20 as explained above, indicated also by the numeral C5.

Since the attacker 30 has not added or deleted any messages to the message flow, or tampered with message M5, the integrity check will not detect that an attack has occurred. However, as indicated by a prime sign, each of the messages, M6 to M8 and M4 are tampered with by the attacker 30. Note that, after the integrity check message is received, the messages sent by the sender node 10 to the receiver node 20 after the nth message (M5) are renumbered from 1. Thus, here, M4 is the fourth message sent by the sender node 10 to the receiver node 20 after the nth message (M5) (not the message sent by the sender node 10 to the receiver node 20 before the nth message).

Thus, in embodiments of the present invention, it is possible that an attacker 30 may tamper with one or more messages sent by the sender node 10 to the receiver node 20. However, the attacker 30 cannot add one or more messages to the message flow, or delete one or more messages from the message flow, without being detected. Thus, the attacker 30 cannot launch a potentially very damaging Denial Of Service (DofS) attack. Furthermore, the greater the number of messages modified by the attacker 30, and therefore the more damaging the attack, the higher the probability that the attack is detected. For example, if a check is asked with probability p and the attacker 30 alters messages with probability q, after n messages the intrusion is detected with probability $(1-(1-p)\cdot(1-q))^n$.

Advantageously, therefore, in embodiments of the present invention, a MITM attack may be detected, without using as much processing power or requiring specialised high speed hardware, as required in known prior art methods which require that an ICV be calculated and added to each message sent by a sender node.

Figure 4:
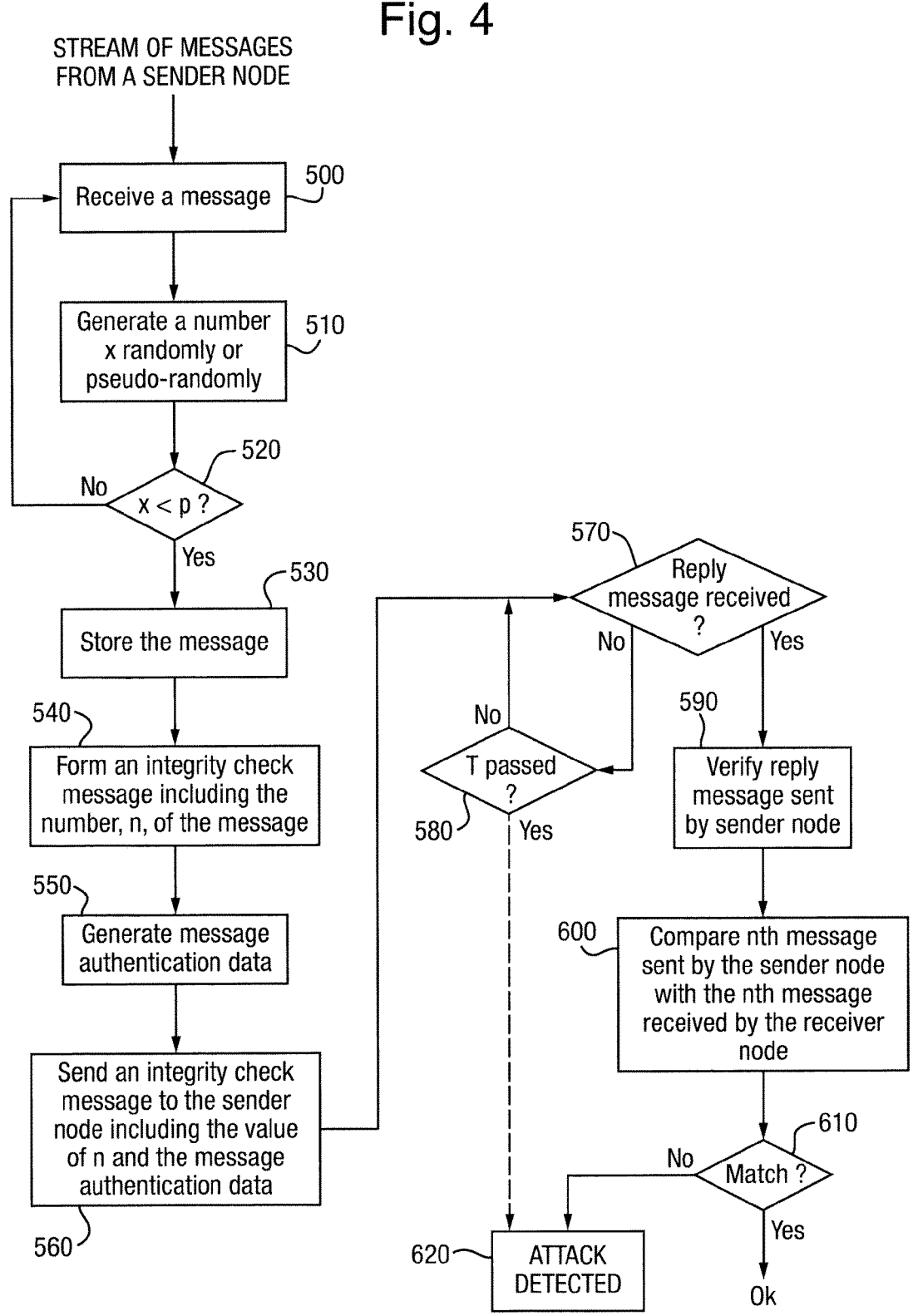
FIG. 4 is a diagram showing steps according to a preferred embodiment of the present invention at a receiver node.
Figure 5:
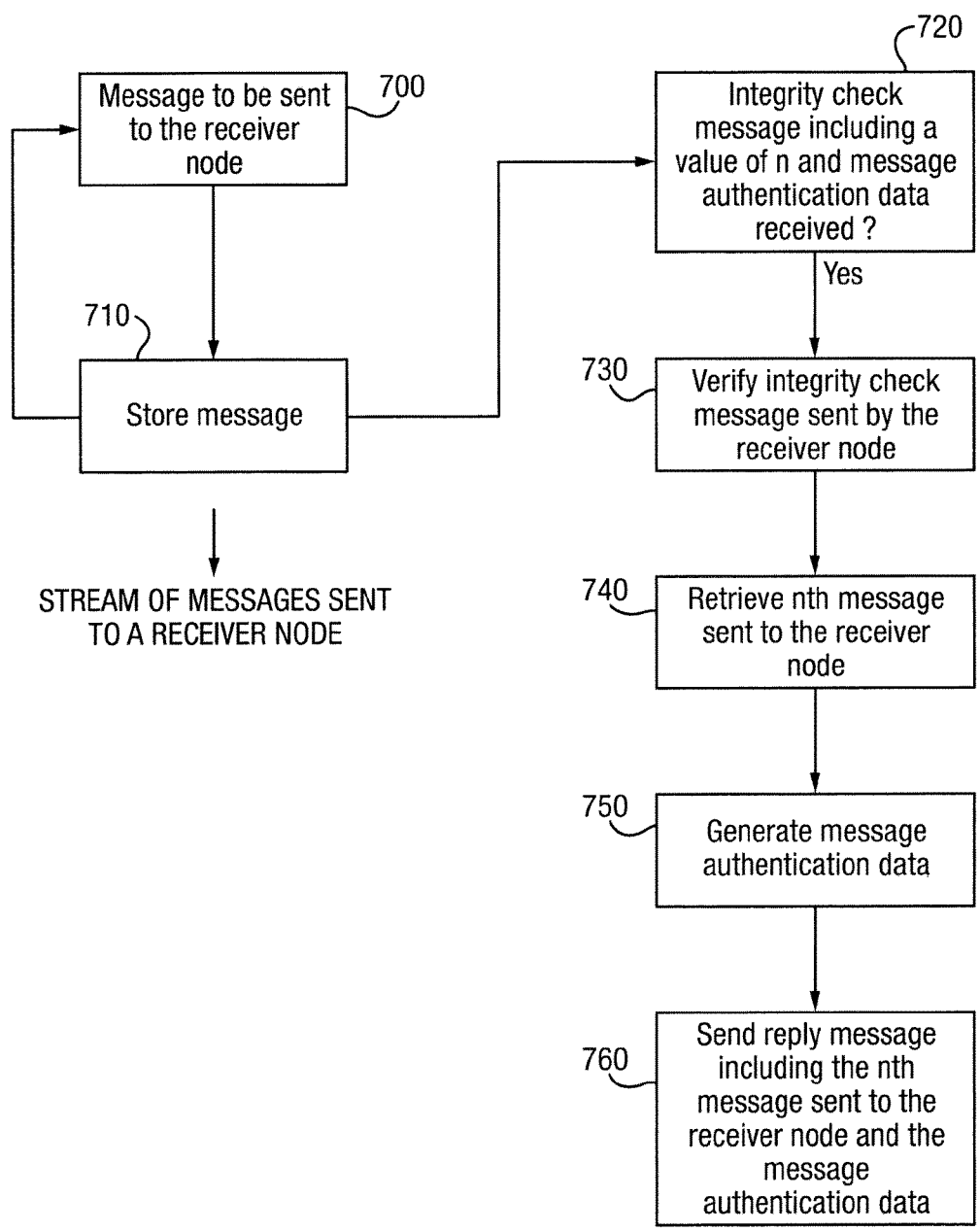
FIG. 5 is a diagram showing steps according to a preferred embodiment of the present invention at a sender node.

FIGS. 4 and 5 illustrate method steps which may be performed by a receiver node 20 and a sender node 10 respectively, according to preferred embodiments of the present invention.

Referring first to FIG. 4, preferably, the nth message which is received from the sender node 10 (i.e. the message which is integrity checked) is selected randomly or pseudo-randomly. This has the advantage that an attacker 30 cannot easily predict which messages will be integrity checked and therefore launch an attack where the attacker 30 only tampers with those messages which will not be integrity checked.

In the preferred embodiment shown in FIG. 4, for each of a plurality of messages received by the receiver node from the sender node at step 500, at step 510 a number, x, is generated randomly or pseudo-randomly. This number, x, is then compared to a probability, p, which indicates the probability that a message received by the receiver node from the sender node is integrity checked. This probability may be determined by the sender node, based on the perceived likelihood of an attack and or the importance of the messages to be transmitted to the receiver node. And is of course a trade-off between increased security (speed at which a DoS attack is detected/the likelihood that a message tampered with by an attacker is detected) and computational power/bandwidth required to detect the attack.

In this example, p may be a number between 0 and 1, where 0 indicates that no messages should be integrity checked, and 1 indicates that all of the messages should be integrity checked. X may also be a number between 0 and 1. Thus, in this example, if x is less that p, which is determined at step 520, then the message is integrity checked. If x is greater than p, the message is not integrity checked. For example, if p is 0.25 (indicating that 1 out of 4 messages should be integrity checked), only if x is less than 0.25 (which has a 1 in 4 chance) will the message be integrity checked.

Of course, in an alternative example, 0 may indicate that all of the messages should be integrity checked, and 1 may indicate that no messages should be integrity checked, and therefore a message will be integrity checked only if x is greater than p. Furthermore, p and x may be numbers within other numeric ranges.

If a message is to be integrity checked, at step 530, the message is stored in a memory device, as described above. At step 540, an integrity check message is also formed including an indication of the number of the message in the message stream, received by the receiver node from the sender node (i.e. the value of n).

At step 550, in this preferred embodiment of the present invention, message authentication data is then generated, and added to the integrity check message, for enabling the sender node to verify that the receiver node sent the integrity check message. And therefore that an attacker has not tampered with the integrity check message. This message authentication data may for example be an ICV or MAC (Message Authentication Code), and as will be understood by those skilled in the art may be generated by applying a hash function to the contents of the integrity check message, using a pre-agreed key. The integrity check message may also be encrypted, although this is not necessary.

At step 560, the integrity check message is then sent to the sender node.

At step 570, it is then determined whether a reply message from the sender node has been received. If a reply message has not been received, and a time T has been waited (step 580), then the receiver node might for example re-send the integrity check message, or determine that an attacker has intercepted the message and detect that an attack has occurred.

Once a reply message has been received, which includes the nth message sent by the sender node to the receiver node, and also as will be explained below in this preferred embodiment of the present invention message authentication data, at step 590, it may be verified that the reply message was indeed sent by the sender node using the message authentication data. For example, the receiver node may use its pre-agreed key to apply a hash function to the reply message, and check that the result matches the message authentication data. Thus, it can be verified that an attacker has not modified the reply message.

At step 600, the nth message sent by the sender node to the receiver node (included in the reply message) is then compared with the nth message received by the receiver node from the sender node stored in the memory device. If the messages match, determined at step 610, then as indicated in FIG. 4, the steps may be repeated for a subsequent message received by the receiver node from the sender node (i.e. a message received after the nth message).

If the messages do not match then, at step 620, an attack is detected. There are many possible subsequent steps. For example, an alarm signal may be generated, or intrusion detection procedures started.

FIG. 5 illustrates method steps which may be performed at the sender node, according to a preferred embodiment of the present invention.

At step 610, for each message in a stream of message to be sent to the receiver node (at step 600), the message is stored in a memory device.

Then, when an integrity check message is received from the receiver node, determined at step 720, which in this preferred embodiment of the present invention includes not only a value of n but also message authentication data, at step 730 it is verified that the integrity check message was sent by the receiver node using the message authentication data. For example, the sender node may use a pre-shared key to apply a hash function to the integrity check message and then check that the result matches the message authentication data.

If it is verified that the integrity check message was sent by the receiver node, then at step 740 the nth message sent by the sender node in the stream of messages sent to the receiver node is retrieved from the memory device. In this preferred embodiment of the present invention, at step 750, message authentication data is then generated, by for example applying a hash function to the nth message. At step 760, a reply message is then sent to the receiver node including the nth message and the message authentication data.

In the above described preferred embodiments of the present invention, the whole of the nth message sent by the sender node, and received by the receiver node, is stored in the respective memory devices, and sent to the receiver node by the sender node in the reply message. However, in alternative embodiments, only a portion of the nth message may be stored in the memory devices, and sent by the sender node to the receiver node in the reply message.

Furthermore, although in step 750 described above, the message authentication data may be generated by applying a hash function to the whole of the nth message. In alternative embodiments, the message authentication data may be generated by only applying a hash function to a part of the nth message, for example to the digest. Advantageously, this requires less processing power than applying the hash function to the whole of the message. Although the cryptographic security of the message authentication data may not be as robust.

Figure 6:
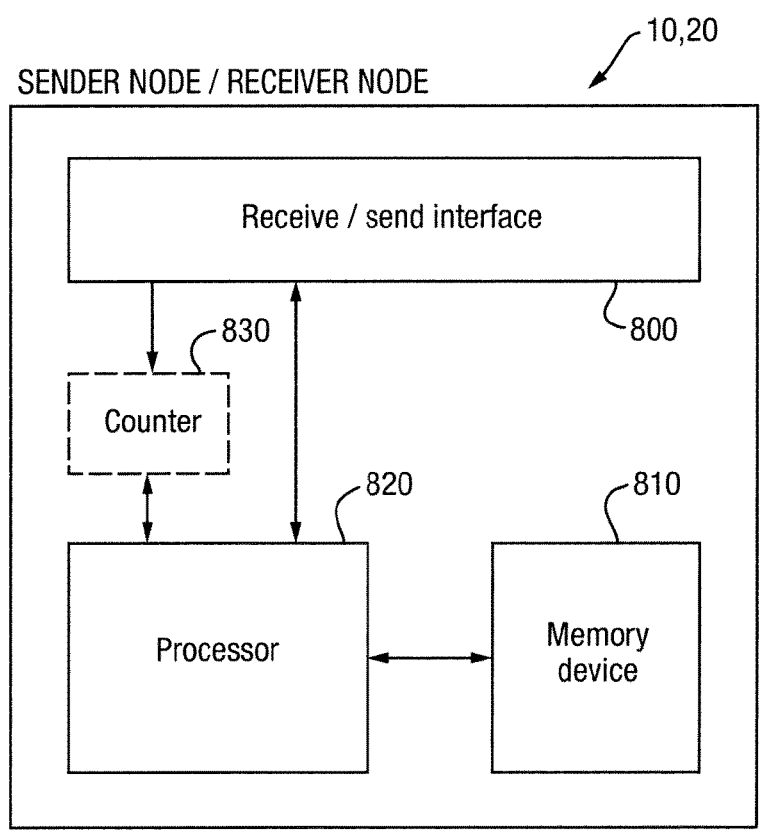
FIG. 6 is a schematic illustration of a sender node/a receiver node according to an embodiment of the present invention.

FIG. 6 is a schematic diagram showing a sender node 10/receiver node 20 according to an embodiment of the present invention. Each of the nodes 10, 20 comprises a send/receive interface 800 configured to send messages to a receiver node, and receive messages from a sender node respectively. Furthermore, these send/receive interfaces may be used to transmit/receive the integrity check message and the reply message.

The nodes 10, 20 further comprise a memory device 810, which may be any type of suitable memory device 710 for storing, where the node is the sender node 10, the at least a portion of each of the plurality of messages sent by the sender node to the receiver node and, where the node is the receiver node, the at least a portion of the nth message received by the receiver node from the sender node.

In addition, the nodes 10, 20 comprise a processor 820 which is configured to perform the methods described above. The processor 820 may for example be a general purpose or any other type of processor, and may comprise one or more processors integrated to any degree.

In an embodiment, the nodes 10, 20 may further comprise a counter 830 configured to count each message sent by the sender node, or received by the receiver node, for example by incrementing by one each time a message is sent/received.

In a preferred embodiment of the present invention, after the nth message is selected, the counter 830 may be reset or restarted such that the messages received by the receiver node 20 from the sender node 10 are counted starting from a message received by the receiver node 20 after the nth message. For example, the message received immediately after the nth message may be considered the first message received by the receiver node 20 from the sender node 10 (n=1).

Similarly, after the sender node 10 receives the integrity check message indicating a value of n, the counter at the sender node 10 may be re-set or re-started and any intermediate messages sent to the receiver node 20 renumbered starting from a message sent to the receiver node 20 after the nth message. For example, the message sent immediately after the nth message may be considered the first message sent by the sender node 10 to the receiver node 20 (n=1).

Advantageously, this means that, if an attack is detected by an integrity check, a subsequent integrity check can detect whether the attack is still ongoing (i.e. if one or more messages have been added to the message flow by an attacker between the previous nth message and the subsequent nth message).

Furthermore, in a preferred embodiment of the present invention, after the sender node 10 receives an integrity check message (indicating a value of n), the portions of each of the messages sent by the sender node 10 to the receiver node 20 before the nth message (which will no longer be required) may be deleted or overwritten from the memory device 710. Advantageously, this allows this space in the memory device 710 to be reused.

The invention claimed is:

1. A method for detecting that an attacker has sent one or more messages to a receiver node, the method comprising:
   storing, at the receiver node, at least a portion of an nth message received by the receiver node from a sender node in a memory device;
   sending, from the receiver node, an integrity check message to the sender node comprising an indication of the value of n, where n is an integer value greater than one;
   receiving, at the receiver node, a reply message from the sender node including at least a portion of the nth message sent by the sender node to the receiver node; and
   comparing the at least a portion of the nth message sent by the sender node to the receiver node with the nth message received by the receiver node from the sender node stored in the memory device.

2. A method according to claim 1, wherein the nth message received by the receiver node from the sender node is selected randomly or pseudo-randomly.

3. A method according to claim 2, wherein selecting the nth message received by the receiver node from the sender node comprises, for each of a plurality of messages received by the receiver node from the sender node:
   generating a number, x, randomly or pseudo-randomly; and
   comparing the number, x, to a probability, p;
   wherein the probability, p, indicates the probability that a message received by the receiver node from the sender node is integrity checked.

4. A method according to claim 1, wherein the integrity check message further comprises message authentication data for enabling the sender node to verify that the receiver node sent the integrity check message.

5. A method according to claim 1, wherein the reply message further comprises message authentication data, further comprising
   using the message authentication in the reply message to verify that the sender node sent the reply message.

6. A method comprising:
   storing, at a sender node, at least a portion of each of a plurality of messages sent by the sender node to a receiver node in a memory device;
   receiving, at the sender node, an integrity check message from the receiver node comprising an indication of a value of n, where n is an integer value greater than one;
   retrieving, at the sender node, at least a portion of the nth message sent by the sender node to the receiver node from the memory device; and
   sending, from the sender node, a reply message to the receiver node including the at least a portion of the nth message sent by the sender node to the receiver node.

7. A method according to claim 6, wherein the integrity check message further comprises message authentication data, further comprising
   using the message authentication data to verify that the receiver node sent the integrity check message.

8. A method according to claim 6, wherein the reply message further comprises message authentication data for enabling the receiver node to verify that the sender node sent the reply message.

9. A method according to claim 8, further comprising generating the message authentication data in the reply message, by applying a hash function to at least a part of the at least a portion of the nth message sent by the sender node to the receiver node.

10. A method according to claim 9, wherein the hash function is applied to only a part of the at least a portion of the nth message sent by the sender node to the receiver node.

11. Apparatus for detecting that an attacker has sent one or more messages to a receiver node, the apparatus comprising a processor and a memory device, wherein the processor is configured to
   store, at the receiver node, at least a portion of an nth message received by the receiver node from a sender node in the memory device;
   send, from the receiver node, an integrity check message to the sender node comprising an indication of the value of n, where n is an integer value greater than one;
   receive, at the receiver node, a reply message from the sender node including at least a portion of the nth message sent by the sender node to the receiver node; and
   compare the at least a portion of the nth message sent by the sender node to the receiver node with the nth message received by the receiver node from the sender node stored in the memory device.

12. Apparatus according to claim 11, wherein the processor is configured to select the nth message received by the receiver node from the sender node randomly or pseudo-randomly.

13. Apparatus according to claim 12, wherein the processor is configured to select the nth message received by the receiver node from the sender node by, for each of a plurality of messages received by the receiver node from the sender node:
   generating a number, x, randomly or pseudo-randomly; and
   comparing the number, x, to a probability, p;
   wherein the probability, p, indicates the probability that a message received by the receiver node from the sender node is integrity checked.

14. Apparatus according to claim 11, wherein the integrity check message further comprises message authentication data for enabling the sender node to verify that the receiver node sent the integrity check message.

15. Apparatus according to claim 11, further comprising a counter configured to count messages received by the receiver node from the sender node;
   wherein the processor is configured to restart the counter after the nth message has been received by the receiver node.

16. Apparatus comprising a processor and a memory device, wherein the processor is configured to:
   store, at a sender node, at least a portion of each of a plurality of messages sent by the sender node to a receiver node in a memory device;
   receive, at the sender node, an integrity check message from the receiver node comprising an indication of a value of n, where n is an integer value greater than one;
   retrieve, at the sender node, at least a portion of the nth message sent by the sender node to the receiver node from the memory device; and
   send, from the sender node, a reply message to the receiver node including the at least a portion of the nth message sent by the sender node to the receiver node.

17. Apparatus according to claim 16, wherein the reply message further comprises message authentication data for enabling the receiver node to verify that the sender node sent the reply message.

18. Apparatus according to claim 17, wherein the processor is configured to generate the message authentication data in the reply message, by applying a hash function to at least a part of the at least a portion of the nth message sent by the sender node to the receiver node.

19. Apparatus according to claim 16, further comprising a counter configured to count the messages sent by the sender node to the receiver node,
   wherein the processor is configured to re-start the counter to count the messages sent by the sender node to the receiver node from after the nth message sent by the sender node to the receiver node.

20. Apparatus according to claim 16, wherein the processor is further configured to delete or overwrite the at least a portion of each of the plurality of messages sent by the sender node to the receiver node from the memory device which were sent to the receiver node before the nth message.

* * * * *